United States Patent
Dearman et al.

(10) Patent No.: US 9,426,229 B2
(45) Date of Patent: Aug. 23, 2016

(54) APPARATUS AND METHOD FOR SELECTION OF A DEVICE FOR CONTENT SHARING OPERATIONS

(75) Inventors: David Alexander Dearman, San Bruno, CA (US); Vidya Raghavan Setlur, Portola Valley, CA (US)

(73) Assignee: Nokia Technologies Oy, Espoo (FI)

( * ) Notice: Subject to any disclaimer, the term of this patent is extended or adjusted under 35 U.S.C. 154(b) by 159 days.

(21) Appl. No.: 13/537,566

(22) Filed: Jun. 29, 2012

(65) Prior Publication Data

US 2014/0006496 A1 Jan. 2, 2014

(51) Int. Cl.
  *G06F 15/16* (2006.01)
  *H04L 29/08* (2006.01)
  *H04W 4/20* (2009.01)
  *H04W 4/00* (2009.01)
  *H04L 29/06* (2006.01)

(52) U.S. Cl.
  CPC ........... *H04L 67/16* (2013.01); *H04L 67/06* (2013.01); *H04L 67/303* (2013.01); *H04W 4/206* (2013.01); *H04L 69/24* (2013.01); *H04W 4/008* (2013.01)

(58) Field of Classification Search
  CPC ......... H04L 51/00; H04L 51/04; H04L 51/06; H04L 51/14; G06F 15/16; H04W 4/00; H04W 4/02; H04W 4/023
  See application file for complete search history.

(56) References Cited

U.S. PATENT DOCUMENTS

| | | | |
|---|---|---|---|
| 8,782,136 B1 * | 7/2014 | Ho et al. ....................... 709/204 |
| 2004/0003133 A1 | 1/2004 | Pradhan et al. | |
| 2004/0266348 A1 * | 12/2004 | Deshpande et al. ......... 455/41.2 |
| 2005/0113123 A1 | 5/2005 | Torvinen | |
| 2005/0255867 A1 * | 11/2005 | Nicodem ....................... 455/466 |
| 2007/0239867 A1 * | 10/2007 | Belimpasakis et al. ....... 709/224 |
| 2007/0286111 A1 | 12/2007 | Corson et al. | |
| 2008/0235599 A1 * | 9/2008 | Emmert et al. ............... 715/748 |
| 2009/0028179 A1 | 1/2009 | Albal | |
| 2009/0319663 A1 | 12/2009 | Giles et al. | |
| 2010/0167646 A1 * | 7/2010 | Alameh et al. ............... 455/41.2 |
| 2010/0186034 A1 * | 7/2010 | Walker ........................... 725/40 |

(Continued)

FOREIGN PATENT DOCUMENTS

EP 1 811 391 A1 7/2007

OTHER PUBLICATIONS

International Search Report and Written Opinion for Application No. PCT/FI2013/050625, dated Oct. 14, 2013.

(Continued)

*Primary Examiner* — Brian J Gillis
*Assistant Examiner* — Austin Moreau
(74) *Attorney, Agent, or Firm* — Alston & Bird LLP

(57) ABSTRACT

An apparatus, method, and computer program product are described that provide for the selection of a device from among one or more devices that is best suited to receive and process content. Upon receipt of input from a user designating a target user with whom content is to be shared, at least one device associated with the designated target user is identified. A capability of one or more of the identified devices to experience the content to be shared is then determined. One of the identified devices is then selected to receive the content at least partially based on the capability determined. In this way, the content is shared with one of the designated target user's devices that is most appropriate for receiving the particular content, providing the target user with the best experience of the content and at the same time allowing for a "user-centric" content sharing experience.

24 Claims, 6 Drawing Sheets

(56) References Cited

U.S. PATENT DOCUMENTS

| | | | |
|---|---|---|---|
| 2011/0201375 A1* | 8/2011 | Gill | H04L 12/189 455/518 |
| 2012/0185291 A1* | 7/2012 | Ramaswamy et al. | 705/7.19 |
| 2013/0013698 A1* | 1/2013 | Relyea et al. | 709/206 |
| 2013/0325949 A1* | 12/2013 | Virani | G06F 9/541 709/204 |

OTHER PUBLICATIONS

Office Action for European Application No. 13 735 356.1 dated Mar. 1, 2016.

* cited by examiner

APPARATUS AND METHOD FOR SELECTION OF A DEVICE FOR CONTENT SHARING OPERATIONS

TECHNOLOGICAL FIELD

Embodiments of the present invention relate generally to selecting a device with which content may be shared from among multiple devices.

BACKGROUND

The information age has made information available to users through various wired and wireless networks on many different types of devices, from laptop computers to cellular telephones. Along with the increased access to information, however, has come increased user demand for sharing content with other users through their user devices, e.g., without necessarily logging on to a computer to manually copy and transfer files.

The prevalence of mobile devices is such that a large portion of the population carries mobile devices (such as cellular phones, tablets, and laptops). Often, users in the same location have a need or desire to share content with each other. A single user is also often associated with more than one device. For example, the same user may have a laptop, a cellular telephone, and a tablet computer, each with different configurations and capabilities.

Accordingly, it may be desirable to provide improved mechanisms by which an appropriate device can be selected for sharing content with users.

BRIEF SUMMARY OF EXAMPLE EMBODIMENTS

Accordingly, embodiments of an apparatus, method, and computer program product are described that may provide for efficient, intuitive, and automatic selection of a target user's device for receiving shared content such that the selected device is best suited for experiencing the content as compared to other potential devices that may also be associated with the target user.

In particular, embodiments of an apparatus for selecting a device for receiving content may include at least one processor and at least one memory including computer program code. The at least one memory and the computer program code may be configured to, with the processor, cause the apparatus to at least receive an input from a user of the apparatus designating a target user with whom content is to be shared; to identify at least one device associated with the designated target user; to determine a capability of a device identified to experience the content to be shared; and to select one of the at least one devices identified to receive the content, where the device is selected at least partially based on the capability determined.

The at least one memory and the computer program code may be further configured to, with the processor, cause the apparatus to determine the capability of a device identified based on at least one of a hardware characteristic, a software characteristic, or context information associated with the respective device. The hardware characteristic may, for example, comprise at least one of a screen size of the respective device, a resolution of a display of the respective device, peripherals associated with the respective device, a network connection status of the respective device, or a processor status of the respective device. The software characteristic may comprise an availability of an application for executing an operation associated with the content. The context information may comprise at least one of a state of an application for executing an operation associated with the content, a frequency of the target user's accessing of similar content via the respective device, or whether the target user is currently accessing the respective device.

In some cases, the at least one memory and the computer program code may be configured to, with the processor, cause the apparatus to identify the at least one device associated with the designated target user based on a proximity of the at least one device to the apparatus. Furthermore, the at least one memory and the computer program code may be further configured to, with the processor, cause the apparatus to, in an instance in which a first device that is a non-proximate device with respect to the apparatus is selected for receiving the content, provide for transmission of a notification regarding execution of an operation sharing the content with the first device to a second device identified as being associated with the designated target user, the second device being a proximate device with respect to the apparatus.

In other embodiments, a method and a computer program product are described for selecting a device for receiving content by receiving an input from a user of the apparatus designating a target user with whom content is to be shared; identifying at least one device associated with the designated target user; determining a capability of a device identified to experience the content to be shared; and selecting one of the at least one devices identified to receive the content, wherein the device is selected at least partially based on the capability determined.

The capability of the device identified may, in some cases, be determined based on at least one of a hardware characteristic, a software characteristic, or context information associated with the respective device. The hardware characteristic may, for example, comprise at least one of a screen size of the respective device, a resolution of a display of the respective device, peripherals associated with the respective device, a network connection status of the respective device, or a processor status of the respective device. The software characteristic may comprise an availability of an application for executing an operation associated with the content. The context information may comprise at least one of a state of an application for executing an operation associated with the content, a frequency of the target user's accessing of similar content via the respective device, or whether the target user is currently accessing the respective device.

In some cases, the at least one device associated with the designated target user may be identified based on a proximity of the at least one device to the apparatus. Moreover, in an instance in which a first device that is a non-proximate device with respect to the apparatus is selected for receiving the content, transmission of a notification regarding execution of an operation sharing the content with the first device may be provided for, where the notification is transmitted to a second device identified as being associated with the designated target user, and the second device is a proximate device with respect to the apparatus.

In still other embodiments, an apparatus is described for selecting a device for receiving content. The apparatus may include means for receiving an input from a user of the apparatus designating a target user with whom content is to be shared; means for identifying at least one device associated with the designated target user; means for determining a capability of a device identified to experience the content to be shared; and means for selecting one of the at least one devices identified to receive the content, wherein the device is selected at least partially based on the capability determined.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
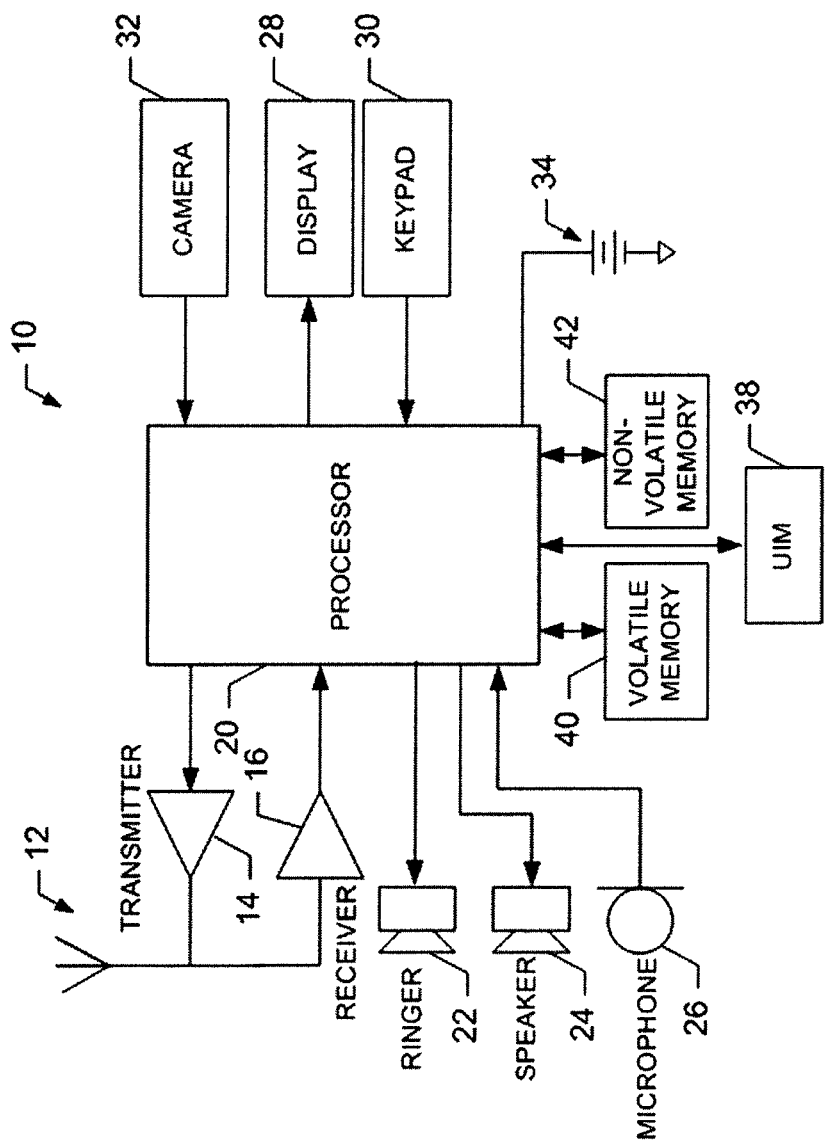
FIG. 1 illustrates one example of a communication system according to an example embodiment of the present invention.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

Users of mobile devices who are co-located (e.g., in the same room or in close proximity to each other) often have a need or desire to share content with each other. The users may be friends sitting in a coffee shop exchanging stories who may want to share content with each other, such as photographs of a recent vacation. Or, the users may be co-workers at a meeting who need to distribute files to others in the meeting to facilitate the work discussion. Many times, a user will be associated with multiple devices, such as one or more cellular phones, portable digital assistants (PDAs), pagers, gaming devices, laptop computers, cameras, tablet computers, or other devices. The user may be carrying one or more of these devices with him, while other devices associated with the user may be elsewhere (such as at the user's home or office).

Different technologies have emerged to facilitate the sharing of content among users. Cloud services, such as Sketchpad, Kaltura, Spotify, Netflix, MobileMe, Sharepoint, etc., typically use a network of remote servers hosted on the Internet to store, manage, and process data, rather than a local server or a personal computer. Such services may work well for remote content sharing, but are often not optimal for content sharing between and among co-located users due to the up-front configuration and set-up efforts that are required.

Bluetooth and Wireless LAN (WLAN) are commonly-used conventional methods of short range ad-hoc communication. Bluetooth, for example, is a low power short-range radio technology that requires communicating devices to be within 10 m from each other. Bluetooth, however, can be difficult to configure, unreliable, and slow when relatively large files (such as media files) are involved. WLAN has an infrastructure mode and an ad-hoc mode, depending on whether the content is routed via an access point or directly point-to-point. The typical indoor range for WLAN is 50 m. WLAN provides physical and data link layers without any specification for higher protocols. As a result, content sharing is less "user-centric" in nature and requires the user to depend on services that are built on the WLAN technology.

Other conventional methods of content sharing may include e-mailing content between users; however, multiple inputs may be required to select recipients of the e-mail, create the e-mail, and send the e-mail, and in some cases the e-mail itself may not be efficiently transferred between the sender and the recipient as a result of firewalls, low bandwidth, server traffic, incomplete or inaccurate recipient addresses, spam filters, etc.

In addition, the content that is shared may require the receiving device to have certain capabilities in order to enable an optimal experience of the content. For example, when a user wishes to share a text document with a target user (e.g., the intended recipient user), the device associated with the target user that is to receive the text document should ideally be configured with word processing capabilities to allow the document to be edited by the target user and/or to allow the target user to view certain features of the text document, such as special characters, fonts, embedded text, etc. The ideal device may also be equipped with a screen large enough to allow the target user to comfortably view the content of the text document. Thus, in this example, if the target user is associated with a cellular telephone and a laptop, the laptop may be more capable of experiencing the text document than the cellular telephone because it is equipped with a larger display, a keyboard, and word processing applications. In other words, of the target user's two devices, the target user would be better served to receive the shared content on his laptop.

Accordingly, embodiments of the present invention provide for devices, systems, and methods for a user to share content with a target user by selecting one of the target user's devices to receive the content based on the capabilities of each available device and a determination of which device may be more capable of handling the content. The selection of a device to receive the content may be done automatically and intuitively, such as part of a "wave" gesture that may be used to identify users of devices that are proximate the source user's device with whom the source user may communicate, such as to share content. Wave gestures are described in greater detail in U.S. application Ser. No. 13/476,615 entitled Apparatus and Method for Creating User Groups, filed on May 21, 2012; U.S. application Ser. No. 13/476,693 entitled Apparatus and Method for Detecting Proximate Devices, filed on May 21, 2012; and U.S. application Ser. No. 13/476,644 entitled Apparatus and Method for Providing for Communications Using Distribution Lists, filed on May 21, 2012, the contents of each of which are hereby incorporated by reference herein.

FIG. 1, which provides one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas, such as an array of patch antennas) in operable communication with a transmitter 14 and a receiver 16. In some embodiments, the antenna 12 or antennas may define a pattern of coverage in a direction of interest, for example, providing a particular "angle of view." The antenna 12 or antennas may, for example, be configured to detect Wi-Fi enabled devices within a predefined distance of the antenna within the angle of view, as described in greater detail in U.S. application Ser. No. 13/356,671 entitled "Directional Peer-to-Peer Networking," filed on Jan. 24, 2012, and in PCT Application No. PCT/US2012/026877 entitled "Determining a Direction of a Wireless Transmitter," filed on Feb. 28, 2012, the contents of both of which are incorporated by reference herein in their entirety.

The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may further include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to encode message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element 32 in order to capture images or video of objects, people, and places proximate to the user of the mobile terminal 10. The mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, which depicts certain elements of an apparatus 50 for selecting a device for receiving content. The apparatus 50 of FIG. 2 may be employed, for example, in conjunction with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a tablet, a mobile telephone, a laptop computer, or other user terminal. Moreover, in some cases, the apparatus 50 may be on a fixed device such as a server or other service platform, and the content may be presented (e.g., via a server/client relationship) on a remote device such as a user terminal (e.g., the mobile terminal 10) based on processing that occurs at the fixed device.

Figure 2:
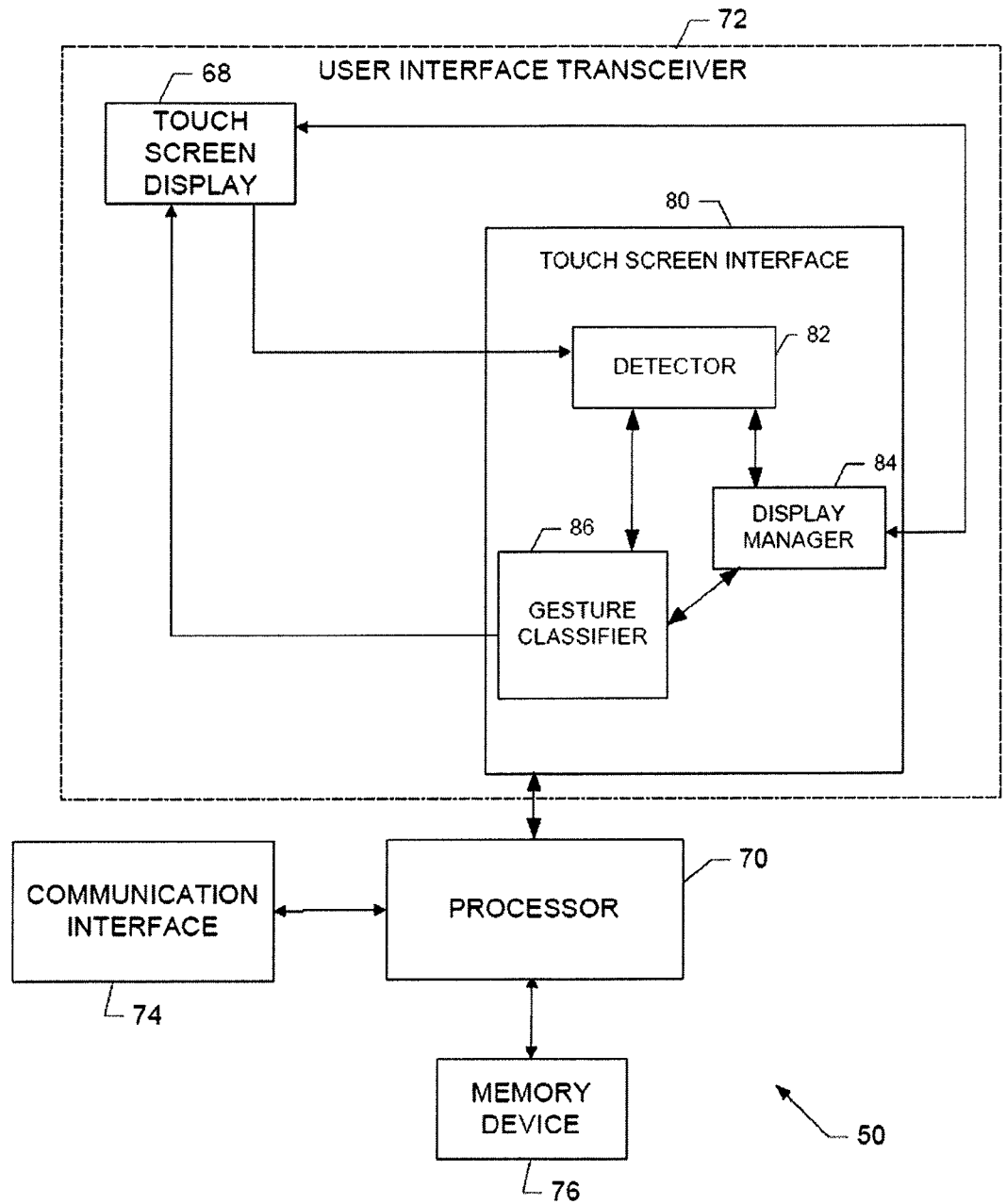
FIG. 2 illustrates a schematic block diagram of an apparatus for providing for selection of a device for receiving content according to an example embodiment of the present invention.

It should also be noted that while FIG. 2 illustrates one example of a configuration of an apparatus for selecting a device for receiving content, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 providing for selection of a device for receiving content may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50.

The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 72 may be in communication with the touch screen display 68 to receive touch inputs at the touch screen display 68 and to analyze and/or modify a response to such indications based on corresponding user actions that may be inferred or otherwise determined responsive to the touch inputs.

With continued reference to FIG. 2, in an example embodiment, the apparatus 50 may include a touch screen interface 80. The touch screen interface 80 may, in some instances, be a portion of the user interface transceiver 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an input in the form of a touch event at the touch screen display 68. As such, the touch screen interface 80 may be in communication with the touch screen display 68 to receive user inputs at the touch screen display 68 and to modify a response to such inputs based on corresponding user actions that may be inferred or otherwise determined responsive to the inputs. Following recognition of a touch event, the touch screen interface 80 may be configured to determine a classification of the touch event and provide a corresponding function based on the touch event in some situations.

In some embodiments, the touch screen interface 80 may include a detector 82, a display manager 84, and a gesture classifier 86. Each of the detector 82, the display manager 84, and the gesture classifier 86 may be any device or means embodied in either hardware or a combination of hardware and software configured to perform the corresponding functions associated with the detector 82, the display manager 84, and the gesture classifier 86, respectively, as described herein. In an exemplary embodiment, each of the detector 82, the display manager 84, and the gesture classifier 86 may be controlled by or otherwise embodied as the processor 70.

The detector 82 may be in communication with the touch screen display 68 to receive user inputs in order to recognize and/or determine a touch event based on each input received at the detector 82. A touch event may be defined as a detection of an object, such as a stylus, finger, pen, pencil, cellular telephone, digital camera, or any other mobile device (including the mobile terminal 10 shown in FIG. 1) or object, coming into contact with a portion of the touch screen display in a manner sufficient to register as a touch. In this regard, for example, a touch event could be a detection of pressure on the screen of the touch screen display 68 above a particular pressure threshold over a given area. Subsequent to each touch event, the detector 82 may be further configured to pass along the data corresponding to the touch event (e.g., location of touch, length of touch, number of objects touching, touch pressure, touch area, speed of movement, direction of movement, length of delay, frequency of touch, etc.) to the gesture classifier 86 for gesture classification. As such, the detector 82 may include or be in communication with one or more force sensors configured to measure the amount of touch pressure (e.g., force over a given area) applied as a result of a touch event, as an example.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, pinch event (e.g., a pinch in or pinch out), and/or the like.

A touch may be defined as a touch event that impacts a single area (without or with minimal movement on the surface of the touch screen display 68) and then is removed. A multi-touch may be defined as multiple touch events sensed concurrently (or nearly concurrently). A stroke may be defined as a touch event followed immediately by motion of the object initiating the touch event while the object remains in contact with the touch screen display 68. In other words, the stroke may be defined by motion following a touch event thereby forming a continuous, moving touch event defining a moving series of instantaneous touch positions (e.g., as a drag operation or as a flick operation). Multiple strokes and/or touches may be used to define a particular shape or sequence of shapes to define a character or symbol.

A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other.

The gesture classifier 86 may also be configured to communicate detection information regarding the recognition, detection, and/or classification of a touch event to the display manager 84. The display manager 84 may be configured to provide control over modifications made to that which is displayed on the touch screen display 68 based on the detection information received from the detector 82 and gesture classifications provided by the gesture classifier 86 in accordance with the responses prescribed for each respective gesture classification and implementation characteristic determined by the gesture classifier 86. In other words, the display manager 84 may configure the display (e.g., with respect to the content displayed and/or the user interface effects presented relative to the content displayed) according to the gesture classification and implementation characteristic classification determined for a given touch event that may be detected at the display.

Figure 3:
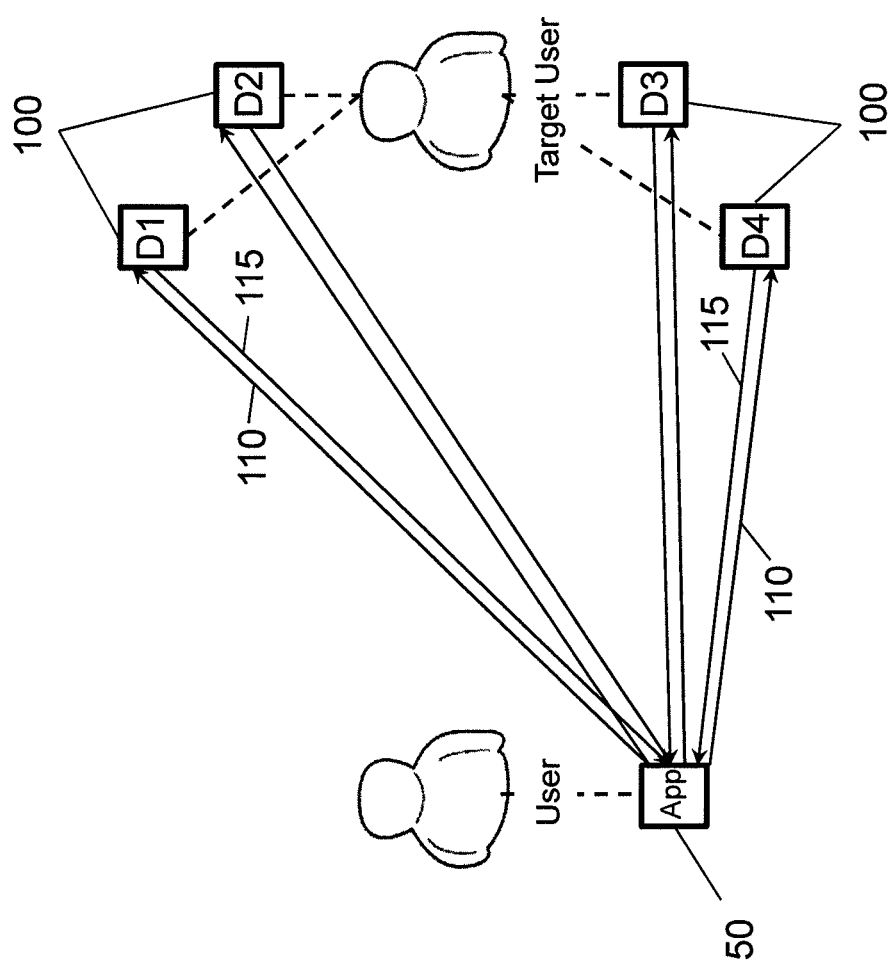
FIG. 3 illustrates communication between a user's apparatus and devices identified as being associated with a designated target user according to an example embodiment of the present invention.

As described above, the apparatus 50 may comprise at least one processor (e.g., processor 70 of FIG. 2) and at least one memory (e.g., memory device 76 of FIG. 2) including computer program code. According to some embodiments, and with reference to FIG. 3, the at least one memory and the computer program code may be configured to, with the processor, cause the apparatus 50 to receive an input from a user of the apparatus designating a target user with whom content is to be shared (e.g., via a sharing operation). The apparatus 50 may be further caused to identify at least one device 100 associated with the designated target user. In FIG. 3, for example, the target user is associated with four devices 100, labeled D1, D2, D3, and D4, the association being represented by dashed lines. D1 may be, for example, the target user's cellular phone; D2 may be his PDA device; D3 may be his laptop; and D4 may be a gaming device.

The apparatus 50 may be caused to determine a capability of at least one of the devices that has been identified to experience the content to be shared. In other words, the apparatus 50 may determine how capable one or more devices 100 from among the identified devices associated with the target user is to receive, process, and/or represent the content to the user for the user's consumption. As a result, and at least partially based on the capability determined, the apparatus 50 may be caused to select one of the at least one devices identified to receive the content. Thus, the apparatus 50 may be able to select a device with a capability that best corresponds to the characteristics of the content to be shared, such as the type of file (e.g., if the content is a media file such as a movie, a text file, a picture, a contact file such as an address or phone number, a voice message, etc.); the size of the file; etc.

The apparatus 50 may, for example, be configured to communicate with the identified devices (e.g., D1-D4) to discover their capabilities. The apparatus 50 may, for example, transmit an inquiry signal 110 to the devices 100 requesting certain information regarding the capabilities of the devices, and the devices, in turn, may transmit a response signal 115 back to the apparatus that, in effect, exposes the capabilities of the devices to the apparatus. Alternatively or additionally, the apparatus 50 may have access to information (e.g., information stored on a memory of the user's device embodying the apparatus 50 or in a database or memory of an external server with which the apparatus can communicate, such as over the Internet) regarding the capability of a device 100 to handle certain content. Thus, the apparatus 50 may be configured to communicate directly with the identified devices or indirectly (e.g., via the Internet), to determine the capability of a respective device and/or to transmit content to the device.

Although in the depicted examples and associated description the apparatus is configured to communicate with the identified devices (directly or indirectly) to discover their capability, it may be the case in some instances that the person with which the user wishes to share content is not, at the moment, carrying any devices. Thus, although that person may have capable devices (e.g., at home, in her car, or at the office), the person may not have any of those devices physically with her such that the user (who is proximate), through the apparatus, can identify an appropriate device with which to share content as described above. In such a case, the person may be carrying a digital token that represents her, such as a chip, antenna, or other device embedded in a badge or some other technology. The digital token may be embodied by an object that is more consistently carried by the person (such as an ID badge required for access to an office building), or it could be a new WiFi-based digital token dedicated to identifying the user. Thus, the apparatus 50 may be configured to identify the user's identity (via communication with the digital token) and may then perform a web look-up to identify the devices associated with the person and the capabilities of the devices. In this way, although the devices are not, at the moment, proximate the apparatus, a proxy for the devices may be visualized if appropriate, and the user may be able to share content with this proxy in some cases. Thus, the next time the person uses the determined device, she would then have the shared content available to her through the respective device.

Regardless, in some embodiments, the at least one memory and the computer program code may be further configured to, with the processor, cause the apparatus 50 to determine the capability of a device identified based on at least one of a hardware characteristic, a software characteristic, or context information associated with the respective device. The hardware characteristic may comprise, for example, a screen size of the respective device, a resolution of a display of the respective device, peripherals associated with the respective device (such as speakers, keyboards, external drives, etc.), a network connection status of the respective device (e.g., whether the device is connected to the Internet or some other network), and/or a processor status of the respective device (e.g., whether the processor is currently executing operations to its full capacity or is available to execute additional operations).

With respect to software characteristics, the apparatus 50 may gather information regarding an availability of an application for executing an operation associated with the content. For example, while a cellular telephone (such as device D1 in FIG. 3) may be capable of receiving and storing contact information, such as a person's telephone number, by virtue of having a contacts/telephone application installed, the cellular phone may not be able to allow a user to (e.g., conveniently) edit a text document as it may not have a word processing application installed or accessible. Thus, while it may be more suitable to share a phone number with D1 (the cellular phone), in another instance in which the content to be shared is not a phone number, but rather is text file, it may be more suitable to share the text file with D3, the laptop, in FIG. 3.

In still other embodiments, context information regarding the devices may be obtained as described above. Such context information may include, for example, a state of an application for executing an operation associated with the content (e.g., whether a word processing application that may be suitable for allowing the target user to view and edit the text file to be shared is open, closed, unresponsive, etc.), a frequency of the target user's accessing of similar content via the respective device, and/or whether the target user is currently accessing the respective device (e.g., whether the target user is logged on to the device).

The apparatus 50 may be configured to select a device from among the target user's associated devices that is best suited to receive and process the content to be shared in a manner that is seamless to the user sharing the content and does not require further input from the user. In other words, upon designating a target user with whom the content is to be shared, the user need not provide any additional inputs to select the particular device to receive the content according to embodiments of the invention described herein. Rather, the apparatus 50 may be configured to identify the devices associated with the designated target user, determine the capability of the devices, and select one of the devices automatically so as to allow for a "user-centric" content sharing experience.

Figure 4:
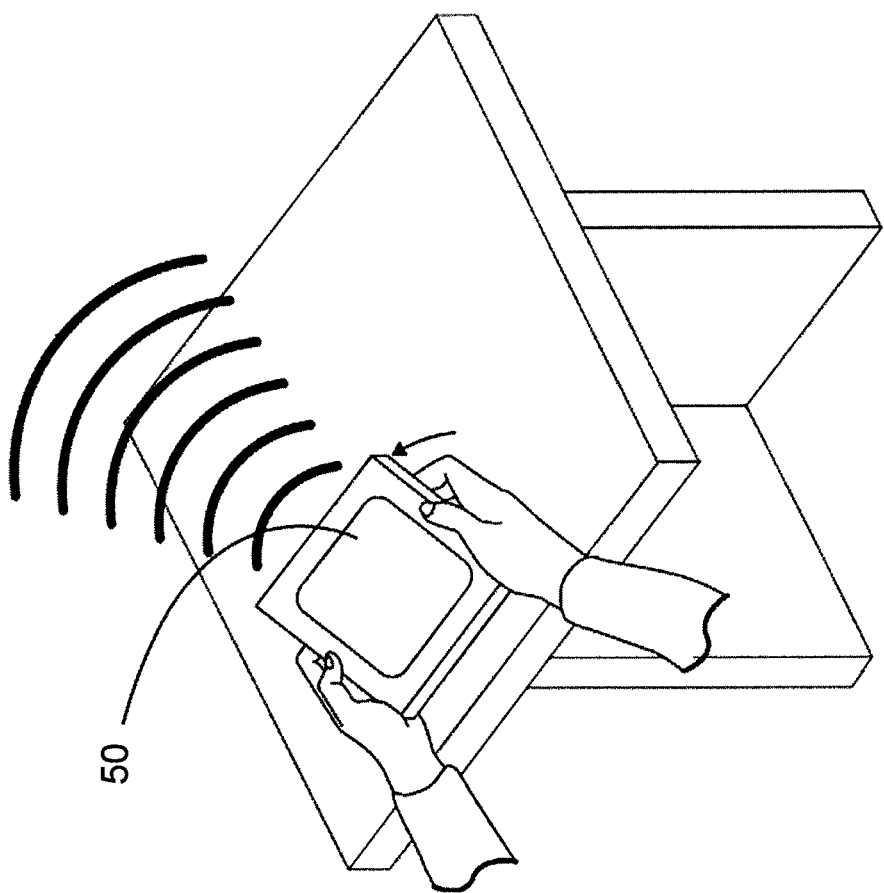
FIG. 4 illustrates a "wave" gesture according to an example embodiment of the present invention.
Figure 5:
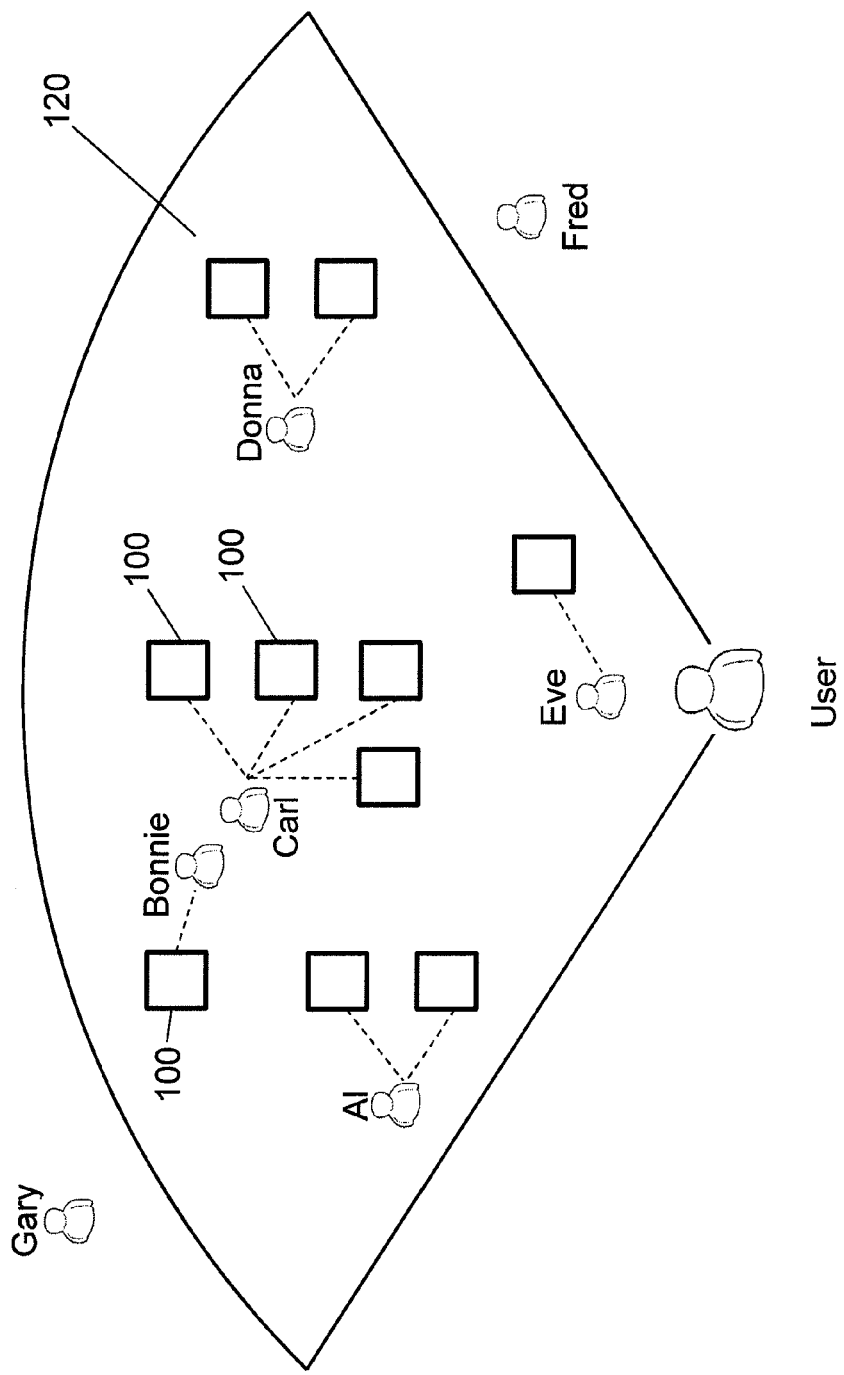
FIG. 5 illustrates identification of devices associated with a designated target user, where the identified devices are within a coverage area proximate the user's apparatus according to an example embodiment of the present invention.

In this regard, in some cases, the at least one memory and the computer program code may be configured to, with the processor, cause the apparatus 50 to identify the at least one device associated with the designated target user based on a proximity of the at least one device to the apparatus. For example, the user may perform a "wave" gesture (shown, e.g., in FIG. 4 and described in greater detail in application Ser. No. 13/467,693, referenced above) to allow the apparatus to ascertain which devices are proximate the apparatus, such as the devices located in the same room or within a certain distance from the user. Referring to FIG. 5, for example, five users (Al, Bonnie, Carl, Donna, and Eve), each having from one to four devices 100 associated with them, may be identified as users with devices that are proximate the user (e.g., devices detected as being within a particular coverage area 120). Bonnie, for example, may be identified as having a single device 100 (represented by a box) associated with her that is proximate the user, even though Bonnie may be associated with additional devices (such as laptops and tablet computers) that are not with Bonnie at the moment but are physically located elsewhere (such as at Bonnie's home or office).

The user may be presented with a list of the five proximate potential target users, and the user may be able to designate one of the identified proximate users to receive content. If, for example, the user designates Carl as the target user that is to receive the shared content, the apparatus 50 may be configured to select the most appropriate of the devices 100 identified as being associated with Carl (e.g., from among the four devices detected as being proximate) with which to share the content. For example, the apparatus 50 may be configured to select the most suitable device as described above with respect to FIG. 3.

In some embodiments, the at least one memory and the computer program code may be further configured to, with the processor, cause the apparatus to, in an instance in which a first device that is a non-proximate device with respect to the apparatus is selected for receiving the content, provide for transmission of a notification regarding execution of an operation sharing the content with the first device to a second device identified as being associated with the designated target user, the second device being a proximate device with respect to the apparatus. For example, with reference to FIG. 5, the user may designate Bonnie as the target user, and the apparatus may in turn identify three devices as being associated with Bonnie (one device being proximate the apparatus, shown in FIG. 5, and two additional devices located elsewhere, not shown). A capability of each of the three devices to experience the particular content to be shared, in this example, may be determined as described above. If, for example, the device selected to receive the content, based on the capability determined, is one of the two non-proximate devices, in some embodiments a notification may be transmitted to the device that is proximate (e.g., the device 100 shown in FIG. 5) regarding execution of the operation sharing the content with the other (non-proximate) device. In this way, Bonnie may be alerted via the device she is carrying with her that content has been shared with one of her other devices.

Several examples are provided below to illustrate the embodiments described above. In one example, upon designation of a target user, only one device may be identified as being associated with the target user. In this case, the capability of the device may not even be determined or considered, and the content may simply be sent to the single identified device. Alternatively, the capability of the identified device may be determined, and if the capability is considered not appropriate for handling the content to be shared, the apparatus may inform the user of the deficiency. As a result, the content may be stored (e.g., in a cloud) until such time that the target user has a more capable device accessible to the apparatus.

In another example, the content to be shared with a target user may be a text document, and the devices identified as being associated with the target user may include a laptop and a cellular telephone. In this example, upon determining the capability of the devices identified to experience the content to be shared, the laptop may be selected to receive the content. The reasons for selection of the laptop may include greater screen space to view the document, a keyboard for providing faster and more convenient interaction with the content, and the availability of a word processing application on the laptop to allow the user to edit the text document. If, however, the content to be shared is a telephone number, then the target user's cellular telephone may be selected for the sharing operation because the cellular telephone may be better equipped with telephonic features that are more reliable or robust for storing and processing a telephone number as compared with the features available on the target user's laptop.

In yet another example, the target user designated by the user of the apparatus may be associated with two devices, both of which are laptops that have comparable hardware and software capabilities. In this case, the context information determined by the apparatus may govern in the selection of one of the devices to receive the content. For example, if the target user is logged on to one of the laptops and not the other, then the apparatus may select the laptop that the target user is logged on to for receipt of the content. This may occur to allow for quicker access by the target user of the content to be shared (e.g., the target user may more readily be able to access and experience the shared content if it is sent to the device that the target user is logged on to). If, however, the target user is logged on to both devices, the apparatus may consider which device the user has used in the past to access the particular type of content to be shared (e.g., the device used most frequently or most recently to access such content). For example, if the user favors one of his devices for accessing media files, but more often uses the other device for accessing text files, and the content to be shared is a media file (e.g., a movie), the apparatus may select the device the user favors for media files as the recipient of the content.

Figure 6:
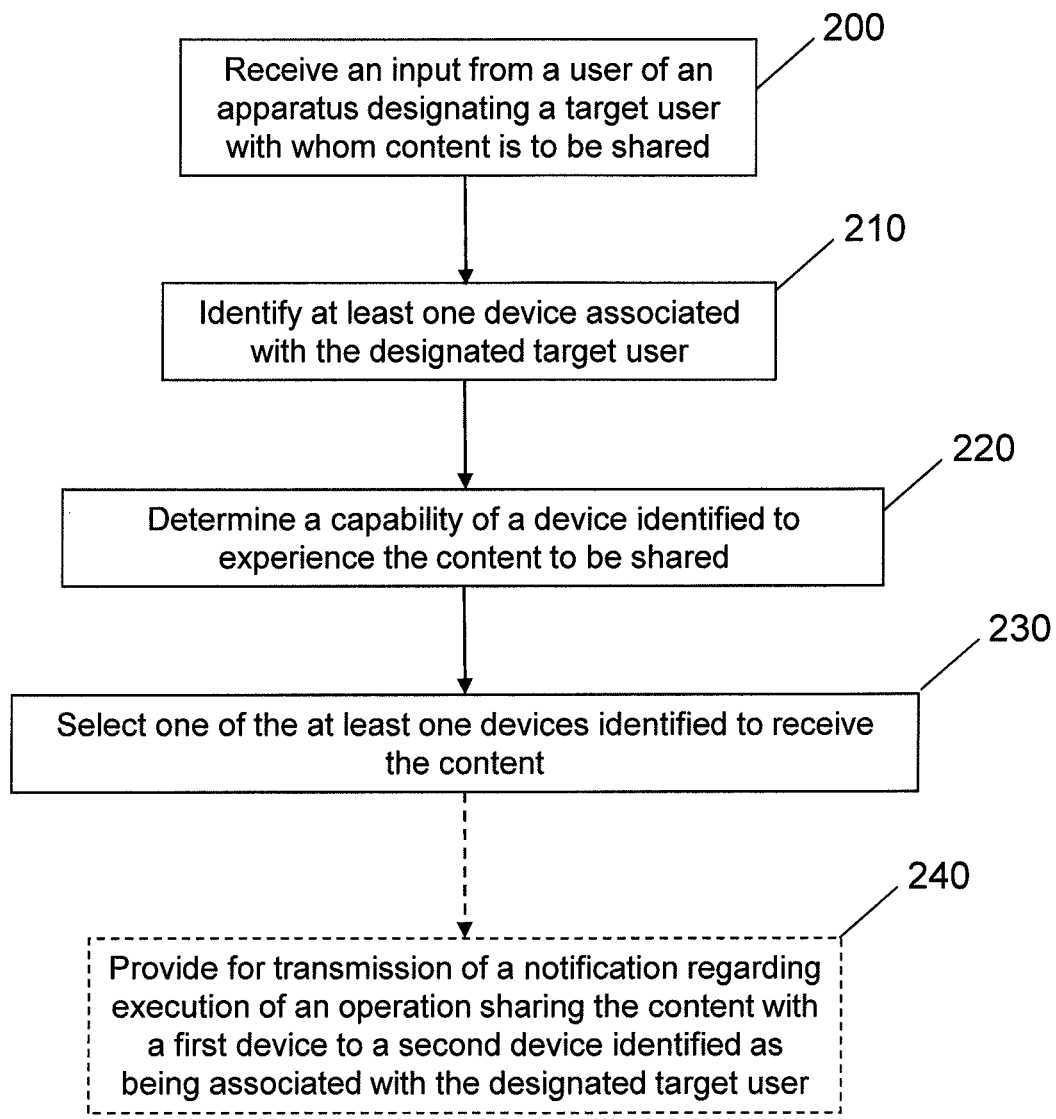
FIG. 6 illustrates a flowchart of a method of selecting a device for receiving content according to another example embodiment of the present invention.

FIG. 6 illustrates a flowchart of a system, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one embodiment of a method for selecting a device for receiving content, as shown in FIG. 6, includes receiving an input from a user of an apparatus designating a target user with whom content is to be shared at Block 200 and identifying at least one device associated with the designated target user at Block 210. A capability of a device identified to experience the content to be shared may be determined at Block 220, and one of the at least one devices identified may be selected to receive the content at Block 230, the selection being at least partially based on the capability determined, as described above.

Determining the capability of a device identified may, for example, comprise determining the capability of the device identified based on at least one of a hardware characteristic, a software characteristic, or context information associated with the respective device. The hardware characteristic may include one or more of the following characteristics: a screen size of the respective device, a resolution of a display of the respective device, peripherals associated with the respective device, a network connection status of the respective device, and/or a processor status of the respective device. The software characteristic may include an availability of an application for executing an operation associated with the content. The context information may include one or more of the following: a state of an application for executing an operation associated with the content, a frequency of the target user's accessing of similar content via the respective device, and/or whether the target user is currently accessing the respective device.

Identifying the at least one device associated with the designated target user may comprise identifying the at least one device associated with the designated target user based on a proximity of the at least one device to the apparatus. In some cases, such as in an instance in which a first device that is a non-proximate device with respect to the apparatus is selected for receiving the content, a notification regarding execution of an operation sharing the content with the first device may be transmitted to a second device identified as being associated with the designated target user at Block 240, the second device being a proximate device with respect to the apparatus.

In some embodiments, certain ones of the operations above may be modified or further amplified as described below. Furthermore, in some embodiments, additional optional operations may be included, an example of which is shown in dashed lines in FIG. 6. Modifications, additions, or amplifications to the operations above may be performed in any order and in any combination.

In an example embodiment, an apparatus for performing the methods of FIG. 6 above may comprise a processor (e.g., the processor 70 of FIG. 2) configured to perform some or each of the operations (200-240) described above. The processor may, for example, be configured to perform the operations (200-240) by performing hardware implemented logical functions, executing stored instructions, or executing algorithms for performing each of the operations. Alternatively, the apparatus may comprise means for performing each of the operations described above. In this regard, according to an example embodiment, examples of means for performing operation 200 may comprise, for example, the processor 70, the user interface transceiver 72, and/or a device or circuit for executing instructions or executing an algorithm for processing information as described above. Examples of means for performing operations 210, 220, and 240 may comprise, for example, the processor 70, the memory device 76, the communication interface 74, and/or a device or circuit for executing instructions or executing an algorithm for processing information as described above. Examples of means for performing operation 230 may comprise, for example, processor 70, the memory device 76, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   detect a plurality of user devices based on proximity of the respective user devices with the apparatus;
   present, on a display associated with the apparatus, a user associated with each of the plurality of detected user devices;
   receive an input from a user of the apparatus designating a target user from among the users presented with whom content is to be shared;
   communicate with the detected user device representing the target user and identify a plurality of target devices associated with the designated target user based on the communication with the detected user device representing the target user;
   determine a capability of the target devices identified to experience the content to be shared;
   in an instance in which the capability of at least one of the target devices is appropriate for experiencing the content to be shared, select one of the at least one of the target devices with appropriate capability to receive the content, wherein the selected target device is selected at least partially based on the capability determined; and
   in an instance in which none of the target devices identified are determined to have a capability appropriate for experiencing the content to be shared, provide for storage of the content on a network.

2. The apparatus of claim 1, wherein the at least one memory and the computer program code are further configured to, with the processor, cause the apparatus to determine the capability of a target device identified based on at least one of a hardware characteristic, a software characteristic, or context information associated with the respective device.

3. The apparatus of claim 2, wherein the hardware characteristic comprises at least one of a screen size of the respective device, a resolution of a display of the respective device, peripherals associated with the respective device, a network connection status of the respective device, or a processor status of the respective device.

4. The apparatus of claim 2, wherein the software characteristic comprises an availability of an application for executing an operation associated with the content.

5. The apparatus of claim 2, wherein the context information comprises at least one of a state of an application for executing an operation associated with the content, a frequency of the target user's accessing of similar content via the respective device, or whether the target user is currently accessing the respective device.

6. The apparatus of claim 1, wherein the at least one memory and the computer program code are further configured to, with the processor, cause the apparatus to, in an instance in which a first target device that is a non-proximate device with respect to the apparatus is selected for receiving the content, provide for transmission of a notification regarding execution of an operation sharing the content with the first target device to a second target device identified as being associated with the designated target user, the second target device being a proximate device with respect to the apparatus.

7. The apparatus of claim 1, wherein the at least one device representing the target user is a digital token configured to serve as a proxy for the plurality of target devices.

8. The apparatus of claim 1, wherein the at least one device representing the target user is one of the plurality of target devices.

9. The apparatus of claim 1, wherein detection of the plurality of user devices based on proximity of the respective user devices with the apparatus is triggered by a wave gesture applied to the apparatus.

10. A method comprising:
    detecting a plurality of user devices based on proximity of the respective user devices with an apparatus;
       presenting, on a display associated with the apparatus, a user associated with each of the plurality of detected user devices;
    receiving an input from a user of the apparatus designating a target user from among the users presented with whom content is to be shared;
       communicating with the detected user device representing the target user and identifying a plurality of target devices associated with the designated target user based on the communication with the detected user device representing the target user;
    determining a capability of the target devices identified to experience the content to be shared;
    in an instance in which the capability of at least one of the target devices is appropriate for experiencing the content to be shared, selecting one of the at least one of the target devices with appropriate capability to receive the content, wherein the selected target device is selected at least partially based on the capability determined; and
    in an instance in which none of the target devices identified are determined to have a capability appropriate for experiencing the content to be shared, providing for storage of the content on a network.

11. The method of claim 10, wherein determining the capability of a target device identified comprises determining the capability of the target device identified based on at least one of a hardware characteristic, a software characteristic, or context information associated with the respective device.

12. The method of claim 11, wherein the hardware characteristic comprises at least one of a screen size of the respective device, a resolution of a display of the respective device, peripherals associated with the respective device, a network connection status of the respective device, or a processor status of the respective device.

13. The method of claim 11, wherein the software characteristic comprises an availability of an application for executing an operation associated with the content.

14. The method of claim 11, wherein the context information comprises at least one of a state of an application for executing an operation associated with the content, a frequency of the target user's accessing of similar content via the respective device, or whether the target user is currently accessing the respective device.

15. The method of claim 10, wherein the at least one device representing the target user is a digital token configured to serve as a proxy for the plurality of target devices.

16. The method of claim 10, wherein the at least one device representing the target user is one of the plurality of target devices.

17. A computer program product comprising at least one non-transitory computer-readable storage medium having computer-executable program code portions stored therein, the computer-executable program code portions comprising program code instructions for:

detecting a plurality of user devices based on proximity of the respective user devices with an apparatus;

presenting, on a display associated with the apparatus, a user associated with each of the plurality of detected user devices;

receiving an input from a user of the apparatus designating a target user from among the users presented with whom content is to be shared;

communicating with the detected user device representing the target user and identifying a plurality of target devices associated with the designated target user based on the communication with the detected user device representing the target user;

determining a capability of the target devices identified to experience the content to be shared;

in an instance in which the capability of at least one of the target devices is appropriate for experiencing the content to be shared, selecting one of the at least one of the target devices with appropriate capability to receive the content, wherein the selected target device is selected at least partially based on the capability determined; and in an instance in which none of the target devices identified are determined to have a capability appropriate for experiencing the content to be shared, providing for storage of the content on a network.

18. The computer program product of claim 17, wherein the program code portions are further configured for determining the capability of the target device identified based on at least one of a hardware characteristic, a software characteristic, or context information associated with the respective device.

19. The computer program product of claim 18, wherein the hardware characteristic comprises at least one of a screen size of the respective device, a resolution of a display of the respective device, peripherals associated with the respective device, a network connection status of the respective device, or a processor status of the respective device.

20. The computer program product of claim 18, wherein the software characteristic comprises an availability of an application for executing an operation associated with the content.

21. The computer program product of claim 18, wherein the context information comprises at least one of a state of an application for executing an operation associated with the content, a frequency of the target user's accessing of similar content via the respective device, or whether the target user is currently accessing the respective device.

22. The computer program product of claim 17, wherein the program code portions are further configured for, in an instance in which a first target device that is a non-proximate device with respect to the apparatus is selected for receiving the content, providing for transmission of a notification regarding execution of an operation sharing the content with the first target device to a second target device identified as being associated with the designated target user, the second target device being a proximate device with respect to the apparatus.

23. The computer program product of claim 17, wherein the at least one device representing the target user is a digital token configured to serve as a proxy for the plurality of target devices.

24. The computer program product of claim 17, wherein the at least one device representing the target user is one of the plurality of target devices.

\* \* \* \* \*